US012753736B2

(12) United States Patent
Simmerlein-Erlbacher

(10) Patent No.: US 12,753,736 B2
(45) Date of Patent: Oct. 6, 2026

(54) WIND TURBINE

(71) Applicant: ODE Consulting UG (haftungsbeschränkt), Berlin (DE)

(72) Inventor: Ewald Wilhelm Simmerlein-Erlbacher, Werneuchen (DE)

(73) Assignee: ODE Consulting UG (haftungsbeschränkt), Berlin (DE)

( * ) Notice: Subject to any disclaimer, the term of this patent is extended or adjusted under 35 U.S.C. 154(b) by 0 days.

(21) Appl. No.: 19/312,931

(22) Filed: Aug. 28, 2025

(65) Prior Publication Data

US 2026/0286934 A1 Sep. 24, 2026

Related U.S. Application Data

(63) Continuation of application No. PCT/EP2025/057323, filed on Mar. 18, 2025.

(51) Int. Cl.
*F03D 5/02* (2006.01)

(52) U.S. Cl.
CPC ...................................... *F03D 5/02* (2013.01)

(58) Field of Classification Search
CPC .................................... F03D 5/02; F03D 5/04
See application file for complete search history.

(56) References Cited

U.S. PATENT DOCUMENTS 4,049,300 A * 9/1977 Schneider ................. F03D 9/22 416/7
4,930,985 A * 6/1990 Klute ........................ F03D 5/02 416/8
8,441,141 B1 * 5/2013 Ouellette .............. B63B 21/502 290/55
8,754,541 B2 * 6/2014 Van Den Bulcke ...... F03D 9/35 290/55

(Continued)

FOREIGN PATENT DOCUMENTS

DE 102016003249 A1 9/2017
WO WO-2011085432 A1 * 7/2011 ............. F03D 3/067
WO 2014/006608 A1 1/2014

OTHER PUBLICATIONS

Zhao, et al. "Ice-proof Heat Storage Film Suitable for Wind Power Blade and Preparation Method thereof," CPO, CN 118832944 A Oct. 25, 2024 (Year: 2024).*

(Continued)

*Primary Examiner* — Nathaniel E Wiehe
*Assistant Examiner* — Joshua R Beebe
(74) *Attorney, Agent, or Firm* — Orbit IP, LLP; Marc G. Martino

(57) ABSTRACT

A wind turbine includes a closed drive belt running over an upper deflection element and a lower deflection element, which are mounted rotatably about mutually parallel, in particular, horizontal rotational axes. The drive belt is divided by the two deflection elements into two belt sides. A plurality of blades are attached to the drive belt and (Continued)

protrude outwardly over the drive belt. For rising air, in each circulation position of the drive belt, the total flow resistance of all blades present on the one belt side is greater than the total flow resistance of all blades present on the other belt side, whereby the drive belt, driven by the rising air, rotates in a circulation direction.

17 Claims, 3 Drawing Sheets

(56) References Cited

U.S. PATENT DOCUMENTS

2003/0141721 A1* 7/2003 Bartlett ............... B29C 44/1228
290/55
2009/0299697 A1* 12/2009 Hamby ................... F03D 17/00
702/182
2018/0283350 A1* 10/2018 Farrant ..................... F03D 5/04

OTHER PUBLICATIONS

Karatasso, et al., "Device for Power Generation from Air Flow," Russian Patent Office, RU 2,688,060 C1, May 17, 2019 (Year: 2019).*

* cited by examiner

WIND TURBINE

CROSS-REFERENCE TO RELATED APPLICATIONS

This continuation application claims priority to International Patent Application No. PCT/EP2025/057323 filed on Mar. 18, 2025, the entire contents of which are fully incorporated herein with this reference.

DESCRIPTION

Field of the Invention

The invention concerns a wind turbine.

Background of the Invention

Wind turbines convert kinetic energy of horizontally inflowing wind into electrical energy, and feed it into a current network. The predominant design is a three-bladed rotor which is rotatably mounted about a horizontal axis at the top of a high tower. A current generator is also arranged at the top of the tower. Usually, the current generator and rotor track the wind direction by means of an electric motor.

SUMMARY OF THE INVENTION

In comparison, the present invention is based on the object of indicating a novel wind turbine, in particular, also suitable for different types of wind flows, which allows energy generation even under variable and less ideal conditions.

This object is achieved according to the invention by a wind turbine comprising: a closed drive belt running over an upper deflection element and a lower deflection element, which are mounted rotatably about mutually parallel, in particular, horizontal rotational axes, wherein the drive belt is divided by the two deflection elements into two belt sides; and a plurality of blades which are attached to the drive belt and protrude outwardly over the drive belt; wherein for rising air, in each circulation position of the drive belt, the total flow resistance of all blades present on the one belt side is greater than the total flow resistance of all blades present on the other belt side, whereby the drive belt, driven by the rising air, rotates in a circulation direction.

The wind turbine according to the invention is designed to use different types of wind flows—including horizontally inflowing wind, thermals (vertically rising warm air flows) and updraughts (rising air flows at hillsides or other geological structures)—either simultaneously or also individually for generating energy. This multifunctional capacity makes the wind turbine particularly efficient and flexible in comparison with conventional wind turbines. Also, no bird strikes or infrasound occur because of operation, since the turbine is configured as a slow runner.

The presence of two rotational axes allows the effective combination and use of different movements and forces from various wind phenomena. The turbine can thus efficiently convert both horizontal and also vertical wind flows into energy. The rotational axes are advantageously oriented horizontally, but may also be sloping by up to 45°. At least one of the two axes is specially designed for force transmission. This means that this axis can transmit the mechanical energy, resulting from the movement of the blades in the air, to a current generator or another energy system.

The blades preferably have a blade front side pointing in the circulation direction and a blade rear side pointing against the circulation direction, wherein at least on some blades, in particular, on all blades, the blade front side and the blade rear side are formed differently. Thus depending on which of the two blade sides is currently directed downward, the blades have a different flow resistance for the rising air. Preferably, all blades are formed identically and are each arranged on the drive belt with the same orientation. Preferably, the blades are arranged on the drive belt equidistantly in the belt direction of the drive belt and oriented parallel to one another on straight belt portions of the drive belt.

The blades preferably each have a blade profile with a profile front side pointing in the circulation direction and a profile rear side pointing against the circulation direction, wherein the profile front side has a convex curvature and the profile rear side has a concave curvature. Thus when its concave profile rear side is directed downward, the blade has a higher flow resistance for rising air than when its convex profile front side is directed downward.

In a particularly preferred refinement, the blade profile is preferably configured as a wing profile in which, for air flowing frontally against a profile end, the profile front side has a longer flow surface than the profile rear side.

The drive belt may for example be configured as a drive chain or link belt, and the deflection elements as sprockets (gear wheels) over which the drive chain runs. The drive belt may also be formed as a belt and the deflection elements as pulleys over which the belt runs.

In preferred embodiments, the blades are mounted on the drive belt so as to each be tiltable about a tilt axis running at right angles or almost at right angles to the blade profile, in order thus to change the angle of attack of the blade. The tilt axis may for example run parallel or also obliquely to the rotational axes of the deflection elements. The angle of attack influences how the wind meets the blades, and how much lift and hence mechanical energy is generated. Because of the possibility of changing the angle of attack, the turbine can adapt its blades optimally to the present wind conditions. This allows a maximal energy generation irrespective of whether the wind is strong or weak, or from which direction it comes.

The tilt angles of at least some, preferably all blades can be set either alone and individually or—as is preferred—jointly and in synchrony. As the angle of attack of the blade profiles can be adjusted either individually or jointly, the wind turbine can react even better to different flow conditions. In a scenario in which the wind meets the turbine from various directions with different strengths, the blades can be set so that they extract the optimum quantity of energy from each individual flow region. This considerably increases the total energy yield of the turbine.

For a common setting of the angles of attack, at least some, preferably all blades are connected together by a closed control belt running over an upper control belt deflection element and a lower control belt deflection element, which are mounted rotatably about the rotational axes of the drive belt deflection elements, wherein the control belt acts on the respective blades eccentrically to their tilt axes so that, by a relative shift of the control belt relative to the drive belt in or against the circulation direction, the blades can be tilted jointly and in synchrony about the tilt axes.

Preferably, the blades comprise or are formed from a heat-storing material (e.g., vermiculite), which is heated by solar irradiation. This heat storage within the blades serves to increase the flow speed of the thermal and, in times of weak thermals, to increase the efficiency in that the air is heated in the thermic uplift regions and hence more energy is extracted from the available air flows.

The wind turbine preferably has an own generator which is driven by one of the two deflection elements, in particular, the lower deflection element, or by its rotary axis. This rotary axis is configured as a drive shaft for the current generator or a gear mechanism and is particularly important since it converts the mechanical energy generated by the movement of the blades directly into electrical energy. In contrast to conventional wind turbines, in which the upper mast end must also carry the current generator, the current generator according to the invention can stand on the ground.

Preferably, the wind turbine comprises at least two drive belts which are arranged axially next to one another and equipped with blades, and the upper and lower deflection elements of which are each mounted rotatably about the same rotational axes. The blades or blade profiles of the drive belts are then offset horizontally in the inflow direction, which allows a better use of the thermal and the updraught. Preferably, the blades of both drive belts are arranged similarly equidistantly, wherein, viewed in the belt direction of the drive belts, the blades of the one drive belt are each arranged between two blades of the other drive belt.

Preferably, the wind turbine has a mast on which the two drive belt deflection elements and, where present, also the control belt deflection elements are rotatably mounted. In principle however, it is also possible to mount the deflection elements rotatably on a sufficiently high wall, such as a house wall, in order to use the air rising at the wall.

Preferably, the mast is mounted so as to be freely rotatable about its vertical axis, whereby the wind turbine can automatically orient itself to the respective wind direction (horizontally inflowing wind, thermal or updraught). This self-orientation ensures that the blades are always optimally oriented to the wind, which again maximises the efficiency and optimises the energy yield.

In total, the wind turbine according to the invention, by the combination of multiple axes, adjustable high-lift blades, heat storage and automatic orientation to the wind direction, offers a considerable improvement in comparison with conventional wind power systems.

Further advantages arise from the description, the claims and the drawing. The embodiments shown and described should not be interpreted as a conclusive list, but rather have an exemplary character for the presentation of the invention.

DETAILED DESCRIPTION OF EMBODIMENTS OF THE INVENTION

Figure 1A:
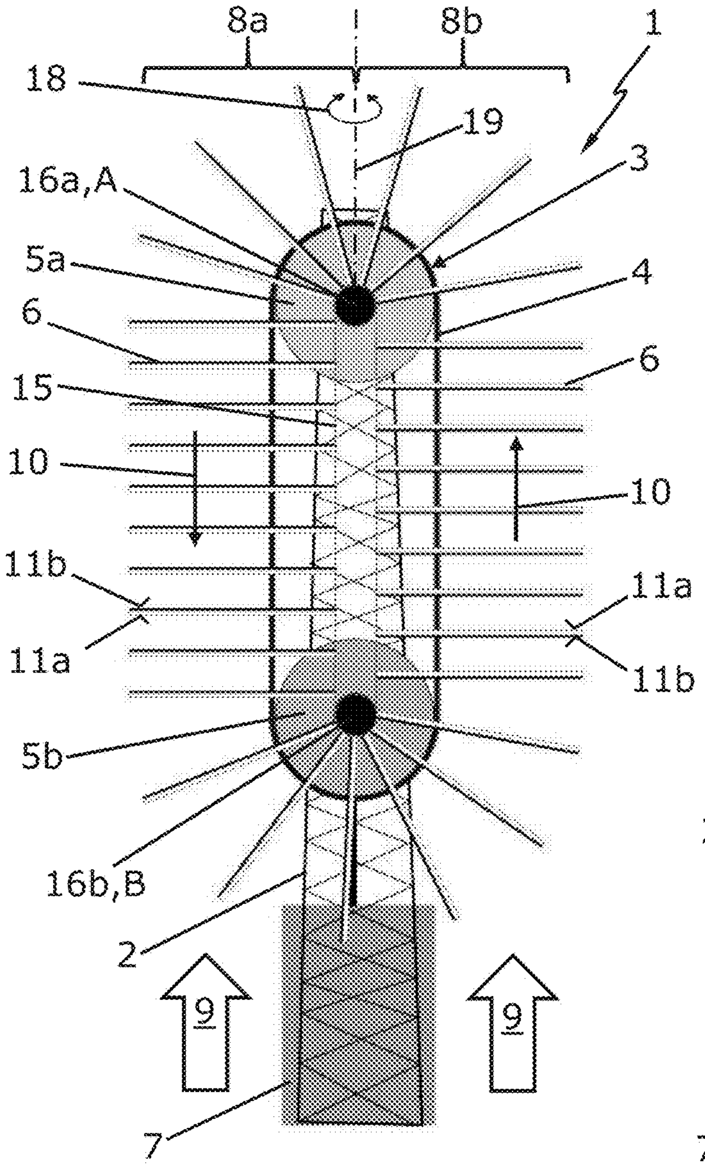
FIGS. 1*a*, 1*b* show a wind turbine according to the invention with a drive belt and a plurality of blades attached thereto, in a front view (FIG. 1*a*) and in a side view (FIG. 1*b*)
Figure 1B:
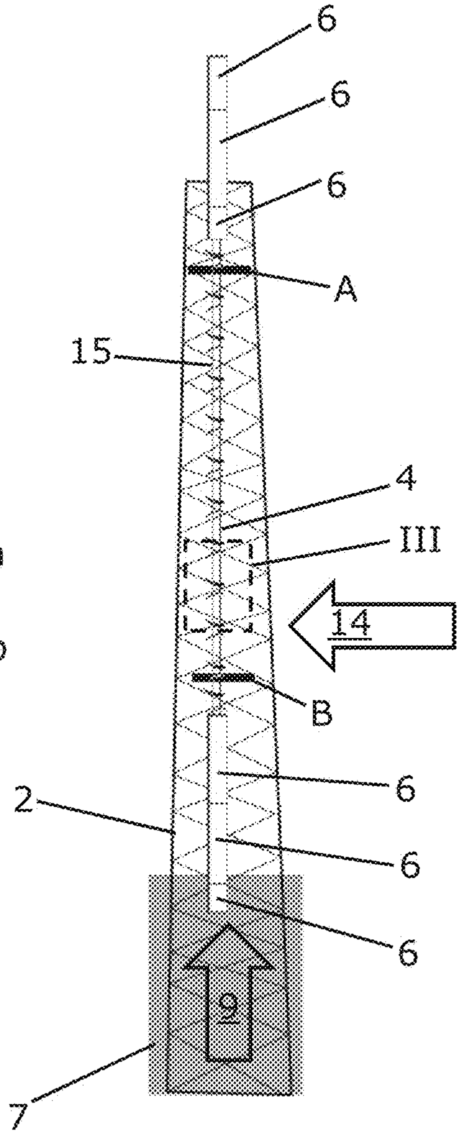

The wind turbine 1 shown in FIG. 1 comprises a mast 2, a belt drive 3 with a closed drive belt 4 which runs around an upper and a lower deflection element 5*a*, 5*b*, a plurality of blades 6 attached to the drive belt 4 and protruding towards the outside over the drive belt 4, and a current generator 7 standing on the ground. The two deflection elements 5*a*, 5*b* are mounted rotatably on the mast 2 about mutually parallel, here horizontal rotational axes A, B and are here arranged precisely vertically above one another. The two deflection elements 5*a*, 5*b* divide the drive belt 4 into two belt sides, that is to say, in FIG. 1*a*, the left and right belt sides 8*a*, 8*b*. The current generator 7 is driven by the lower deflection element 5*b* or its rotary axis B.

The belt drive 3 may for example be a chain drive in which the drive belt 4 is configured as a drive chain (link belt), and the deflection elements 5*a*, 5*b* as sprockets over which the drive chain runs, or as a belt drive in which the drive belt 4 is configured as a belt and the deflection elements 5*a*, 5*b* as pulleys over which the belt runs.

In each circulation position of the drive belt 4, for the rising air 9, the total flow resistance of all blades 6 present on the right belt side 8*b* is greater than the total flow resistance of all blades 6 present on the left belt side 8*a*, whereby the drive belt 4, driven by rising air 9, rotates in the rotational or circulation direction 10, i.e., in FIG. 1*a* counter-clockwise. The right belt side 8*a* thus runs upward and the left belt side 8*b* runs downward.

Figure 3:
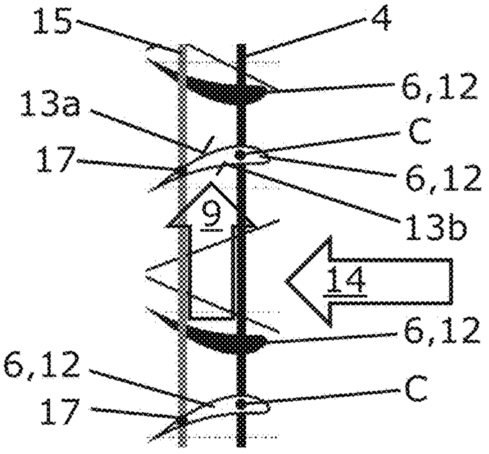
FIG. 3 shows an enlarged detail view at Ill in FIG. 1*b;*
Figure 2:
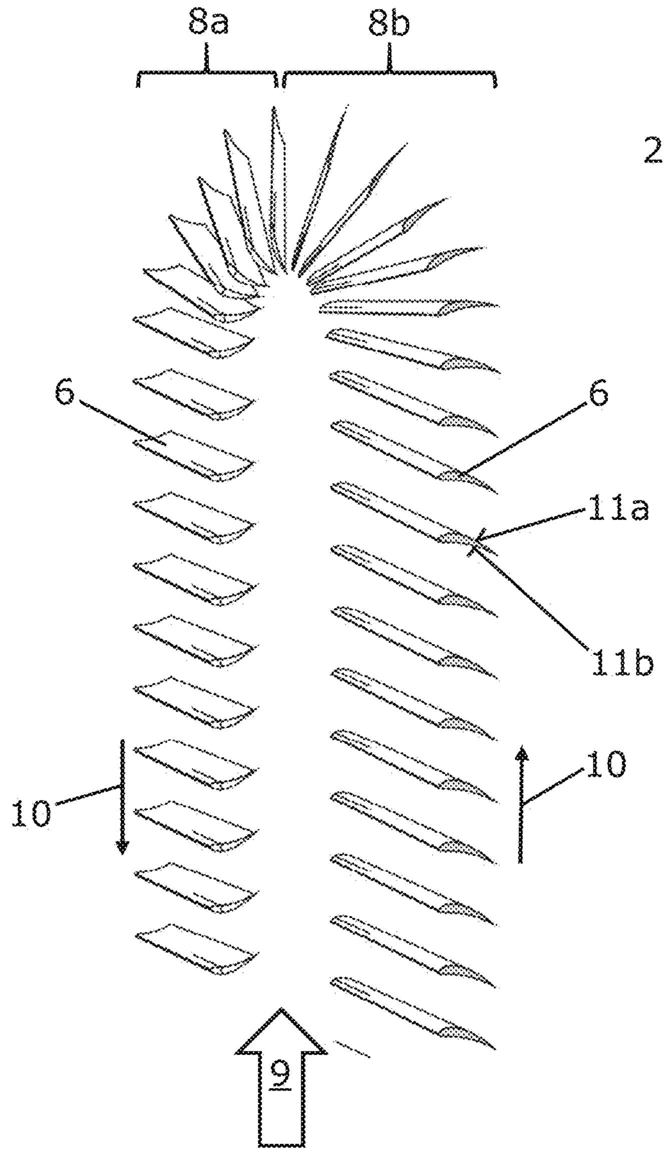
FIG. 2 shows an upper part of the drive belt and of the blades attached thereto, in a perspective view.

As FIG. 2 shows, the blade front side 11*a* of the blades 6 pointing in the circulation direction 10, and the blade rear side 11*b* of the blades 6 pointing against the circulation direction 10, are formed differently from one another. Thus depending on which of the two blade sides 11*a*, 11*b* is currently directed downward, the blades 6 have a different flow resistance for the rising air 9. In the exemplary embodiment shown, all blades 6 are formed identically and, as shown in FIG. 3, have a blade profile 12 with a convexly curved profile front side 13*a* pointing in the circulation direction 10 and a concavely curved profile rear side 13*b* pointing against the circulation direction 10. The respective blades 6 are arranged on the drive belt 4 equidistantly and with the same orientation in the belt direction of the drive belt 4. The blades 6 are oriented parallel with one another on the two straight belt portions of the drive belt 4, i.e., between the two deflection elements 5*a*, 5*b*. In FIG. 3, the profiles 12 of the blades 6 on the downward-running belt side 8*a* are shown in black, and the profiles 12 of the blades 6 on the upward-running belt side 8*b* are shown in grey. For example, the blade length is around 10 m, the blade depth (blade profile length) around 1 m, and the blade spacing around 1 m.

Figure 4:
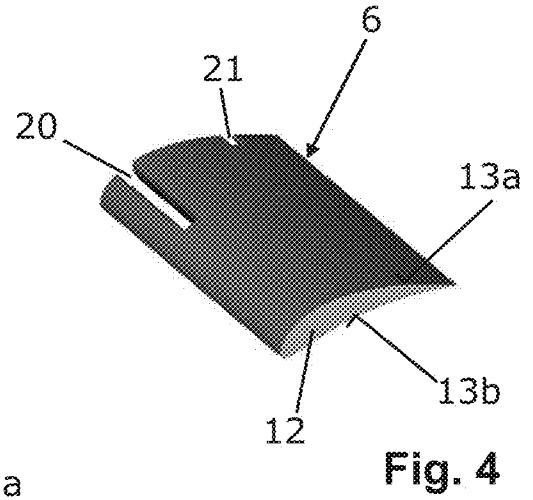
FIG. 4 shows the blade profile of the blade in a front view onto the outer blade end.

As FIG. 4 shows, the blade profile 12 may be configured as a wing profile in which, for air 14 flowing frontally or horizontally against the right profile end in FIG. 4, the convexly curved profile front side 13*a* has a longer flow surface than the concavely curved profile rear side 13*b*. The inflowing air 14 meets both the longer curved blade top side and also the shorter blade underside and is then deflected downward. At the top, the air flows faster than at the bottom. On the blade top side, because of the high flow speed, the dynamic pressure increases and the static pressure decreases accordingly. On the blade underside, because of the low flow resistance, the dynamic pressure decreases and the static pressure increases. Consequently, the resulting static pressure pushes against the blade underside and leads to a lift.

Figure 5:
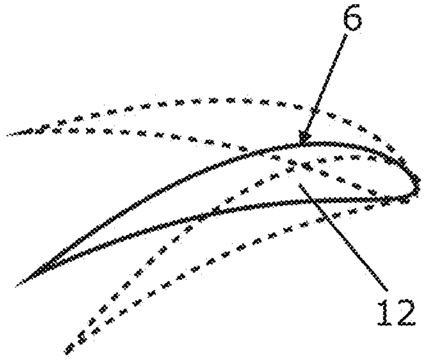
FIG. 5 shows the blade profile shown in FIG. 4 in a normal position and in positions tilted downward and upward relative thereto.

As FIG. 3 furthermore shows, the blades 6 are each mounted on the drive belt 4 so as to be tiltable about a tilt axis C running here at right angles to the blade profile 12, in order to adjust the tilt or contact angle of the blade 6, as indicated in FIG. 5. In order here to adjust the angles of attack of all blades 6 jointly and in synchrony, all blades 6 are connected together by a closed control belt 15 which runs over an upper control belt deflection element 16*a* and a lower control belt deflection element 16*b*, which are mounted rotatably about the rotational axes A, B of the drive belt deflection elements 5*a*, 5*b*. The control belt 15 is arranged axially offset to the drive belt 4 and acts on the respective blades 6 eccentrically to their tilt axes C at point 17, so that by a relative shift of the control belt 15 relative to the drive belt 4 in or against the circulation direction 10, the blades 6 can be tilted jointly and in synchrony. As FIG. 4 shows, the blades 6 each have two cutouts 20, 21 for the drive belt 4 and the control belt 15.

Preferably, the blades are made from a heat-storing material (e.g., vermiculite) which, in particular, is heated by solar irradiation. This heat storage in the blades 6 increases the flow speed of the rising air 9, as the air 9 is heated in the thermal lift regions and thus more energy is extracted from the available air flows.

As indicated in FIG. 1 by a double arrow 18, the mast 2 is mounted freely rotatably about its vertical axis 19, whereby the wind turbine 1 can automatically orient itself optimally to the respective wind direction (horizontally inflowing wind, thermal or updraught).

Figure 6:
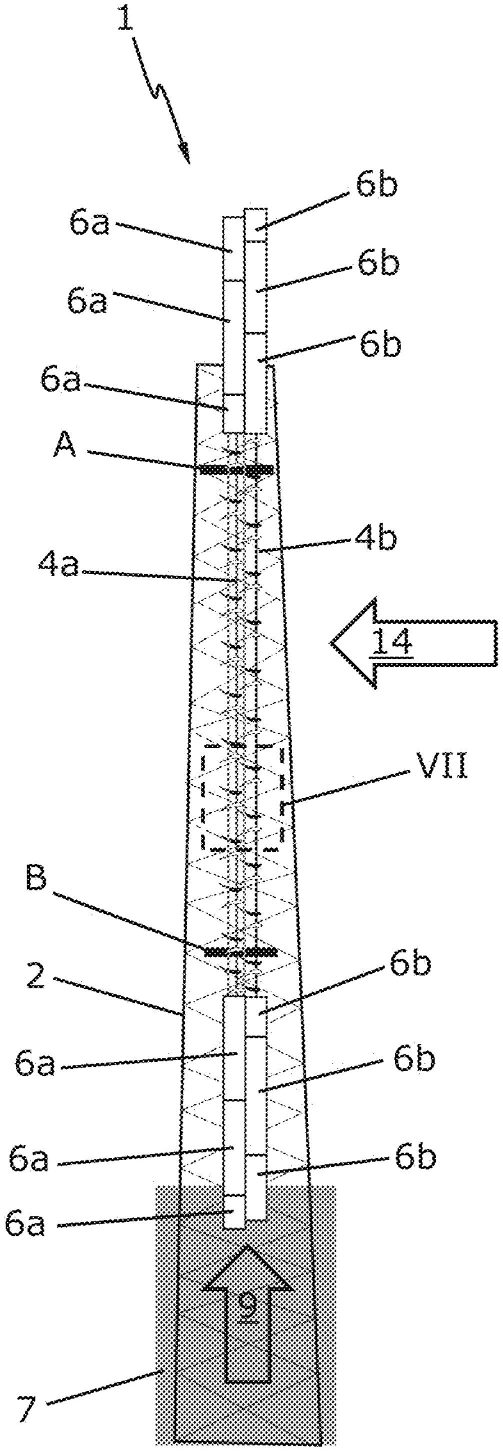
FIG. 6 shows a wind turbine according to the invention with two drive belts arranged next to one another and with a plurality of blades attached thereto, in a side view similar to FIG. 1*b*.

The wind turbine 1 shown in FIG. 6 comprises two drive belts 4*a*, 4*b* which are arranged axially or horizontally to one another and each equipped with blades, and the upper and lower deflection elements 5*a*, 5*b* of which are each rotatably mounted about the same rotational axes A, B. The blades of the left drive belt 4*a* in FIG. 6 are marked 6*a*, and the blades of the right drive belt 4*b* in FIG. 6 are marked 6*b*.

Figure 7:
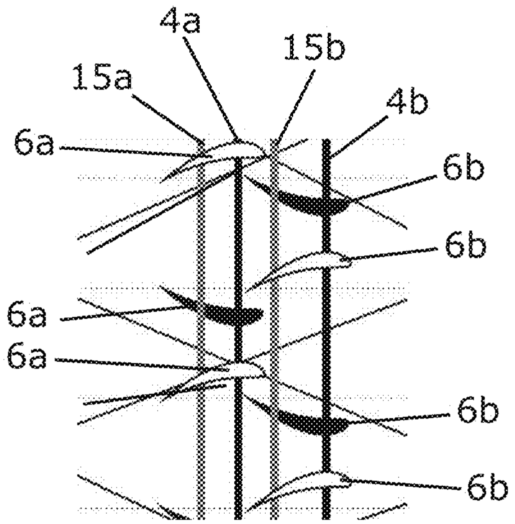
FIG. 7 shows an enlarged detail view at VII in FIG. 6.

As shown in FIG. 7, the blades 6*a*, 6*b* of the two drive belts 4*a*, 4*b* are offset in the direction of the horizontally inflowing air 14, i.e., axially or horizontally offset, which allows a better use of the thermals and the updraught. The respective blades 6*a*, 6*b* are arranged similarly equidistantly on the two drive belts 4*a*, 4*b*, wherein, viewed in the belt direction of the drive belts 4*a*, 4*b*, the blades of the one drive belt are in each case arranged between two blades 6 of the other drive belt. The left control belt for the left blades 6*a* is marked 15*a*, and the right control belt for the right blades 6*b* is marked 15*b*.

What is claimed is:

1. A wind turbine, comprising:

a closed drive belt running over an upper drive belt deflection element and a lower drive belt deflection element which are mounted rotatably about mutually parallel rotational axes, wherein the drive belt is divided by the two deflection elements into two belt sides; and a plurality of blades which are attached to the drive belt and protrude outwardly over the drive belt;

wherein for rising air, in each circulation position of the drive belt, the total flow resistance of all blades present on the one belt side is greater than the total flow resistance of all blades present on the other belt side, wherein the drive belt, driven by the rising air, rotates in a circulation direction;

wherein the blades are mounted on the drive belt so as to each be tiltable about a tilt axis running at right angles to the blade profile;

wherein the tilt angles of at least some of the blades can be set jointly and in synchrony; and wherein at least some blades are connected together by a closed control belt running over an upper control belt deflection element and a lower control belt deflection element which are mounted rotatably about the rotational axes of the drive belt deflection elements, wherein the control belt acts on the respective blades eccentrically to their tilt axes wherein a relative shift of the control belt relative to the drive belt in or against the circulation direction, the blades can be tilted jointly and in synchrony about the tilt axes.

2. The wind turbine according to claim 1, wherein the blades have a blade front side pointing in the circulation direction and a blade rear side pointing against the circulation direction, wherein at least on some blades, the blade front side and the blade rear side are formed differently.

3. The wind turbine according to claim 1, wherein all blades are formed identically and are each arranged on the drive belt with the same orientation.

4. The wind turbine according to claim 1, wherein the blades are arranged on the drive belt equidistantly in the belt direction of the drive belt.

5. The wind turbine according to claim 1, wherein the blades are oriented parallel to one another on straight belt portions of the drive belt.

6. The wind turbine according to claim 1, wherein the blades each have a blade profile with a profile front side pointing in the circulation direction and a profile rear side pointing against the circulation direction, wherein the profile front side has a convex curvature and the profile rear side has a concave curvature.

7. The wind turbine according to claim 6, wherein for air flowing frontally against a profile end of the blade, the profile front side has a longer flow surface than the profile rear side.

8. The wind turbine according to claim 1, wherein the drive belt is formed as a drive chain, and the drive belt deflection elements as sprockets over which the drive chain runs, or in that the drive belt is formed as a belt and the drive belt deflection elements as pulleys over which the belt runs.

9. The wind turbine according to claim 1, wherein the tilt angles of at least some of the blades can be set alone and individually.

10. The wind turbine according to claim 1, wherein the blades comprise or are formed from a heat-storing material.

11. The wind turbine according to claim 1, wherein a current generator which is driven by one of the two drive belt deflection elements.

12. The wind turbine according to claim 11, wherein the current generator stands on the ground.

13. The wind turbine according to claim 1, wherein at least two drive belts are arranged axially next to one another and equipped with blades, and the upper and lower drive belt deflection elements of which are each mounted rotatably about the same rotational axes.

14. The wind turbine according to claim 13, wherein, viewed in the belt direction of the drive belts, the blades of the one drive belt are each arranged between two blades of the other drive belt.

15. The wind turbine according to claim 1, wherein a mast on which the two drive belt deflection elements and the control belt deflection elements are rotatably mounted.

16. The wind turbine according to claim 15, wherein the mast is mounted configured to be freely rotatable about its vertical axis.

17. The wind turbine according to claim 1, wherein the rotational axes of the upper drive belt deflection element and the lower drive belt deflection element are horizontal.

* * * * *